United States Patent
Lance et al.

(10) Patent No.: US 11,519,814 B2
(45) Date of Patent: Dec. 6, 2022

(54) FLUID USAGE MONITORING AND CONTROL SYSTEM

(71) Applicant: FB Global Plumbing Group LLC, North Olmsted, OH (US)

(72) Inventors: Matthew J. Lance, North Ridgeville, OH (US); Brian P. Frackelton, Macedonia, OH (US)

(73) Assignee: FB GLOBAL PLUMBING GROUP LLC, North Olmsted, OH (US)

( * ) Notice: Subject to any disclaimer, the term of this patent is extended or adjusted under 35 U.S.C. 154(b) by 196 days.

(21) Appl. No.: 16/791,130

(22) Filed: Feb. 14, 2020

(65) Prior Publication Data
US 2020/0264067 A1 Aug. 20, 2020

Related U.S. Application Data

(60) Provisional application No. 62/806,458, filed on Feb. 15, 2019.

(51) Int. Cl.
*E03B 7/07* (2006.01)
*G01M 3/28* (2006.01)
(Continued)

(52) U.S. Cl.
CPC ............. *G01M 3/2876* (2013.01); *G01F 1/34* (2013.01); *G01F 15/005* (2013.01);
(Continued)

(58) Field of Classification Search
CPC .... G01M 3/2876; G01M 3/2815; G01M 3/28; G01F 1/34; G01F 1/363; G01F 15/005; G05D 7/0629; G05D 7/0635; E03B 7/075
(Continued)

(56) References Cited

U.S. PATENT DOCUMENTS 4,832,311 A * 5/1989 Kimura .................. F16K 47/02
251/118
5,161,563 A * 11/1992 Thompson .............. E03C 1/122
137/486
(Continued)

FOREIGN PATENT DOCUMENTS

AU 2016353089 A1 5/2018
CA 3004832 A1 5/2017
(Continued)

OTHER PUBLICATIONS

Office Action from U.S. Appl. No. 16/270,690 dated Oct. 21, 2020.
(Continued)

*Primary Examiner* — Minh Q Le
(74) *Attorney, Agent, or Firm* — Calfee, Halter & Griswold LLP

(57) ABSTRACT

In a method of monitoring fluid usage in a fluid system, a proportional control valve is provided, including a valve element operable to control fluid flow from a fluid source to the fluid system. A first pressure upstream of the valve element and a second pressure downstream of the valve element are measured to identify a pressure differential across the valve element. In response to the identified pressure differential, the valve element is adjusted to one of a plurality of flow positions to adjust the pressure differential across the valve element to substantially match a predetermined pressure differential. A flow rate through the proportional control valve is determined based on the first pressure, the second pressure, and the adjusted flow position of the valve element. Based on the determined flow rate over time, an amount of fluid usage in the fluid system is determined.

23 Claims, 13 Drawing Sheets

(51) Int. Cl.
*G01F 15/00* (2006.01)
*G01F 1/34* (2006.01)
*G05D 7/06* (2006.01)
*G01F 1/36* (2006.01)

(52) U.S. Cl.
CPC ............ *G05D 7/0629* (2013.01); *E03B 7/075* (2013.01); *G01F 1/363* (2013.01); *G01M 3/28* (2013.01); *G01M 3/2815* (2013.01); *G05D 7/0635* (2013.01)

(58) Field of Classification Search
USPC ................................................ 137/12, 487.5
See application file for complete search history.

(56) References Cited

U.S. PATENT DOCUMENTS

| | | | |
|---|---|---|---|
| 5,441,070 A * | 8/1995 | Thompson | G01M 3/002 |
| | | | 137/557 |
| 5,460,196 A | 10/1995 | Yonnet | |
| 5,636,653 A | 6/1997 | Titus | |
| 5,992,218 A | 11/1999 | Tryba et al. | |
| 6,186,162 B1 | 2/2001 | Purvis et al. | |
| 6,216,727 B1 * | 4/2001 | Genova | F17D 5/02 |
| | | | 137/460 |
| 6,237,618 B1 | 5/2001 | Kushner | |
| 6,532,979 B1 | 3/2003 | Richter | |
| 6,655,413 B2 | 12/2003 | Condon et al. | |
| 6,773,135 B1 | 8/2004 | Packer | |
| 6,792,967 B1 | 9/2004 | Franklin | |
| 6,963,808 B1 * | 11/2005 | Addink | E03B 7/071 |
| | | | 702/50 |
| 7,147,204 B2 | 12/2006 | Hollingsworth et al. | |
| 7,255,012 B2 * | 8/2007 | Hedtke | F16K 3/03 |
| | | | 73/861.61 |
| 7,308,824 B2 | 12/2007 | Trescott, Jr. et al. | |
| 7,549,435 B2 | 6/2009 | Walter | |
| 8,109,289 B2 * | 2/2012 | Trnka | F24D 19/1036 |
| | | | 700/282 |
| 8,210,029 B2 | 7/2012 | Hart et al. | |
| 8,269,651 B2 | 9/2012 | Zigdon et al. | |
| 8,347,427 B2 | 1/2013 | Klicpera | |
| 8,402,984 B1 | 3/2013 | Ziegenbein et al. | |
| 8,439,062 B1 | 5/2013 | Ziegenbein et al. | |
| 8,489,342 B1 | 7/2013 | Dugger et al. | |
| 8,644,804 B2 | 2/2014 | Blackwell et al. | |
| 8,776,824 B2 | 7/2014 | Yao | |
| 8,866,634 B2 | 10/2014 | Williamson et al. | |
| 8,887,324 B2 | 11/2014 | Klicpera | |
| 8,887,768 B2 | 11/2014 | Hart et al. | |
| 8,893,320 B2 | 11/2014 | Klicpera | |
| 8,960,637 B2 * | 2/2015 | Parker | F25B 41/31 |
| | | | 251/129.11 |
| 9,061,307 B2 | 6/2015 | Klicpera et al. | |
| 9,110,848 B1 | 8/2015 | Kim | |
| 9,111,221 B1 | 8/2015 | Kelly et al. | |
| 9,139,986 B2 | 9/2015 | Smith et al. | |
| 9,142,118 B2 | 9/2015 | Patenaude et al. | |
| 9,146,172 B2 | 9/2015 | Trescott | |
| 9,224,277 B1 | 12/2015 | Kelly et al. | |
| 9,254,499 B2 | 2/2016 | Klicpera | |
| 9,266,136 B2 | 2/2016 | Klicpera | |
| 9,297,150 B2 | 3/2016 | Klicpera | |
| 9,348,689 B2 | 5/2016 | Kim | |
| 9,371,632 B2 | 6/2016 | Trescott | |
| 9,410,833 B1 | 8/2016 | Leaders et al. | |
| 9,432,763 B2 | 8/2016 | Scharf | |
| 9,494,480 B2 | 11/2016 | Klicpera | |
| 9,508,233 B2 | 11/2016 | Kelly et al. | |
| 9,534,978 B2 | 1/2017 | Trescott et al. | |
| 9,714,501 B2 | 7/2017 | Keiter et al. | |
| 9,749,792 B2 | 8/2017 | Klicpera | |
| 9,752,952 B2 | 9/2017 | Poon | |
| 9,759,632 B2 | 9/2017 | Trescott et al. | |
| 9,857,805 B2 | 1/2018 | Halimi | |
| 9,874,466 B2 | 1/2018 | Leaders et al. | |
| 9,928,724 B2 | 3/2018 | Alcorn et al. | |
| 9,964,461 B2 * | 5/2018 | Hart | G01M 3/022 |
| 10,036,143 B2 | 7/2018 | Trescott et al. | |
| 10,094,095 B2 | 10/2018 | Enev et al. | |
| 10,428,495 B2 | 10/2019 | Halimi | |
| 10,458,872 B2 | 10/2019 | Halimi | |
| 10,489,038 B2 | 11/2019 | Klicpera | |
| 10,648,842 B2 | 5/2020 | Croteau | |
| 2001/0024165 A1 | 9/2001 | Steen, III et al. | |
| 2002/0033759 A1 | 3/2002 | Morello | |
| 2004/0193329 A1 | 9/2004 | Ransom et al. | |
| 2005/0016592 A1 * | 1/2005 | Jeromson | F16K 37/0083 |
| | | | 137/487.5 |
| 2005/0016593 A1 | 1/2005 | Ephrat et al. | |
| 2006/0137090 A1 | 6/2006 | Jeffries et al. | |
| 2007/0095400 A1 | 5/2007 | Bergquist et al. | |
| 2007/0289635 A1 | 12/2007 | Ghazarian et al. | |
| 2008/0266125 A1 * | 10/2008 | Windisch | E03B 7/071 |
| | | | 340/605 |
| 2009/0049599 A1 | 2/2009 | Parsons et al. | |
| 2009/0066524 A1 | 3/2009 | Yukawa et al. | |
| 2009/0101213 A1 * | 4/2009 | Kielb | G05D 7/0635 |
| | | | 137/12 |
| 2009/0140866 A1 | 6/2009 | Heilmann et al. | |
| 2010/0313958 A1 * | 12/2010 | Patel | G01F 15/0755 |
| | | | 137/552 |
| 2010/0315245 A1 | 12/2010 | Wofford | |
| 2011/0035063 A1 | 2/2011 | Palayur | |
| 2011/0298635 A1 | 12/2011 | Yip | |
| 2012/0255342 A1 | 10/2012 | Ahdout | |
| 2013/0073094 A1 | 3/2013 | Knapton et al. | |
| 2013/0263955 A1 * | 10/2013 | Hirota | F16K 11/10 |
| | | | 137/636 |
| 2014/0069207 A1 | 3/2014 | Leaders et al. | |
| 2014/0097367 A1 | 4/2014 | Burt | |
| 2015/0376874 A1 | 12/2015 | Breedlove | |
| 2016/0085241 A1 * | 3/2016 | Lee | G05D 7/0635 |
| | | | 700/282 |
| 2016/0123834 A1 | 5/2016 | Vilbrandt et al. | |
| 2016/0161310 A1 | 6/2016 | Leaders et al. | |
| 2016/0163177 A1 | 6/2016 | Klicpera | |
| 2016/0284193 A1 | 9/2016 | Davis et al. | |
| 2016/0298317 A1 | 10/2016 | Trescott | |
| 2016/0334255 A1 | 11/2016 | Gestner | |
| 2016/0348802 A1 | 12/2016 | Halimi et al. | |
| 2016/0370249 A1 | 12/2016 | Hart et al. | |
| 2016/0378322 A1 | 12/2016 | Klicpera | |
| 2017/0030528 A1 | 2/2017 | Dietzen et al. | |
| 2017/0090485 A1 * | 3/2017 | Ohashi | G01F 1/00 |
| 2017/0131174 A1 | 5/2017 | Enev et al. | |
| 2017/0159267 A1 | 6/2017 | Halimi | |
| 2017/0292893 A1 | 10/2017 | Bunker et al. | |
| 2017/0298597 A1 | 10/2017 | Hammond et al. | |
| 2017/0322567 A1 | 11/2017 | Klein et al. | |
| 2018/0042189 A1 | 2/2018 | Klein et al. | |
| 2018/0112376 A1 | 4/2018 | Beger et al. | |
| 2018/0127957 A1 | 5/2018 | Enev et al. | |
| 2018/0136673 A1 | 5/2018 | Halimi | |
| 2018/0164136 A1 | 6/2018 | Gestner | |
| 2018/0173249 A1 * | 6/2018 | Hayashi | F16K 37/005 |
| 2018/0182228 A1 | 6/2018 | Alcorn et al. | |
| 2018/0259982 A1 | 9/2018 | Halimi | |
| 2019/0025150 A1 | 1/2019 | Picardi et al. | |
| 2019/0154539 A1 | 5/2019 | Banerjee et al. | |
| 2019/0377369 A1 | 12/2019 | Evans | |
| 2020/0057457 A1 | 2/2020 | Halimi et al. | |
| 2020/0209097 A1 | 7/2020 | Evans | |
| 2020/0264068 A1 | 8/2020 | Mess et al. | |

FOREIGN PATENT DOCUMENTS

| | | |
|---|---|---|
| EP | 1172779 A3 | 2/2003 |
| EP | 3180594 A1 | 6/2017 |
| EP | 3155381 A4 | 3/2018 |
| WO | 2003100153 A1 | 12/2003 |
| WO | 2009103729 A1 | 8/2009 |

(56) References Cited

FOREIGN PATENT DOCUMENTS

| WO | 2017083547 A1 | 5/2017 |
|----|---------------|--------|
| WO | 2017112480 A1 | 6/2017 |
| WO | 2017083547 A1 | 11/2017 |
| WO | 2018076203 A1 | 5/2018 |
| WO | 2018085636 A1 | 5/2018 |
| WO | 2018091143 A1 | 5/2018 |

OTHER PUBLICATIONS

Search Report and Written Opinion for International Application No. PCT/US20/18047 dated Jun. 25, 2020.
Notice of Allowance from U.S. Appl. No. 16/270,690 dated Feb. 24, 2021.

* cited by examiner

FLUID USAGE MONITORING AND CONTROL SYSTEM

CROSS-REFERENCE TO RELATED APPLICATION

This application claims priority to and all benefit of U.S. Provisional Patent Application Ser. No. 62/806,458, filed on Feb. 15, 2019 and entitled FLUID USAGE MONITORING AND CONTROL SYSTEM, the entire disclosure of which is incorporated herein by reference.

BACKGROUND

Plumbing systems, such as residential plumbing systems, are often subject to leakage or improper shutoff at a variety of locations, which may be difficult to identify, and may result in increased water costs and/or property damage.

SUMMARY

According to an exemplary embodiment of the present disclosure, a water usage control and monitoring system includes a proportional control valve having a valve body with an inlet port and an outlet port, a valve element assembled with the valve body and disposed between the inlet port and the outlet port, and an electronically operated actuator assembled with the valve body and operable to adjust the valve element to a plurality of flow positions between a closed position and a fully open position. An upstream pressure sensor is provided in fluid communication with the inlet port, and a downstream pressure sensor is provided in fluid communication with the outlet port. A control module is operatively connected with the electronically operated actuator, and in communication with the upstream and downstream pressure sensors. The control module is configured to operate the electronically operated actuator in response to pressure indicating signals from the upstream and downstream pressure sensors, to adjust the valve element to one of the plurality of flow positions to adjust a pressure differential across the valve element to substantially match a predetermined pressure differential.

According to another exemplary embodiment of the present disclosure, a method of monitoring fluid usage in a fluid system is contemplated. In the exemplary method, a proportional control valve is provided, including a valve element operable to control fluid flow from a fluid source to the fluid system. A first pressure upstream of the valve element and a second pressure downstream of the valve element are measured to identify a pressure differential across the valve element. In response to the identified pressure differential, the valve element is adjusted to one of a plurality of flow positions to adjust the pressure differential across the valve element to substantially match a predetermined pressure differential. A flow rate through the proportional control valve is determined based on the first pressure, the second pressure, and the adjusted flow position of the valve element. Based on the determined flow rate over time, an amount of fluid usage in the fluid system is determined.

According to another exemplary embodiment of the present disclosure, a method of identifying usage of a water fixture in a plumbing system is contemplated, with the plumbing system including at least first and second water fixtures operable to supply water from a water source. In the exemplary method, a first flow modulating device is provided with the first water fixture, wherein the first flow modulating device is configured to provide a first identifiable flow characteristic corresponding to use of the first water fixture. A flow rate from the water source to the plumbing system is measured. The measured flow rate is compared with the first identifiable flow characteristic to identify use of the first water fixture.

BRIEF DESCRIPTION OF DRAWINGS

Further advantages and benefits will become apparent to those skilled in the art after considering the following description and appended claims in conjunction with the accompanying drawings, in which:

DETAILED DESCRIPTION

Figure 1:
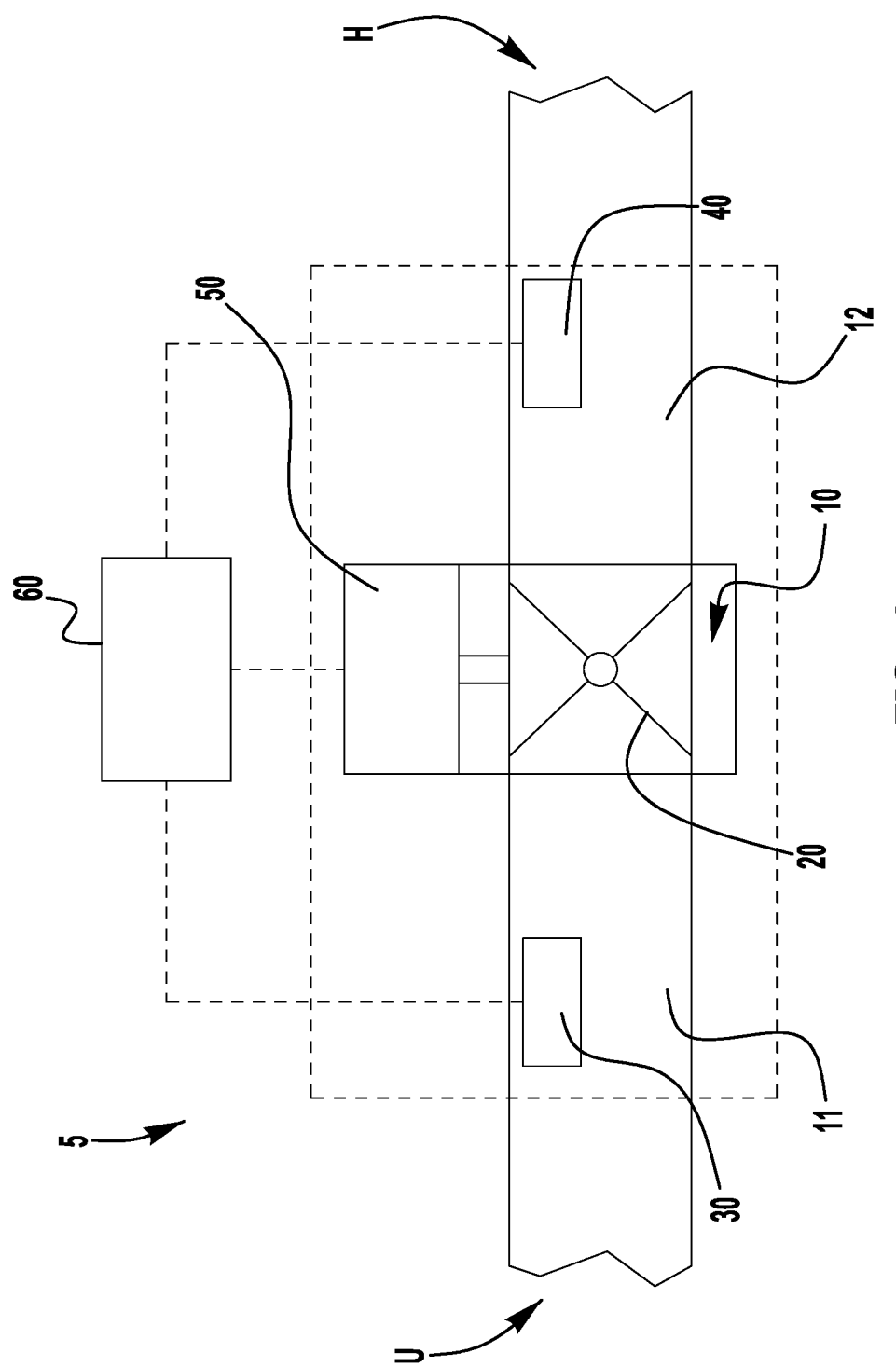
FIG. 1 is a schematic illustration of an electronically operated proportional valve arrangement for a fluid system, according to an exemplary embodiment of the present disclosure.

This Detailed Description merely describes exemplary embodiments of the invention and is not intended to limit the scope of the claims in any way. Indeed, the invention as claimed is broader than and unlimited by the preferred embodiments, and the terms used in the claims have their full ordinary meaning. For example, while exemplary embodiments described in this disclosure relate to use of a fluid usage monitoring system for measurement and control of water usage in a plumbing system, it is to be understood that one or more of the features described herein may additionally or alternatively be applied to other water system or to other fluid systems, such as, for example, natural gas, air, propane, steam, oil, gas, or other such fluid systems.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

"Computer," "controller," "control module," or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. Computer devices herein can have any of various configurations, such as handheld computers (e.g., so-called smart phones), pad computers, tablet laptop computers, desktop computers, and other configurations, and including other form factors. The various computers and processors herein have logic for performing the various corresponding functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. In exemplary embodiments, some or all of the software is stored on memory, which includes one or more non-transitory computer readable media of one or more local or remote data storage devices. As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., RAM, ROM, PROM, EPROM, EEPROM, flash PROM, external flash memory drives, etc. Communication circuits herein include antennas and/or data ports and driver chips for sending and receiving communications with other devices. In exemplary embodiment, communication circuits can include any one or more of Wi-Fi antennas and circuitry, LTE antennas and circuitry, GPS antennas and circuitry, CDPD antennas and circuitry, GPRS antennas and circuitry, GSM antennas and circuitry, UMTS antennas and circuitry, Ethernet circuitry, and other antennas and circuitry, USB ports and circuitry (e.g., standard, micro, mini, etc.), RS-232 ports and circuitry, proprietary ports and circuitry (e.g., APPLE 30-pin and Lightning ports), RFID antennas and circuitry, NFC antennas and circuitry, bump technology antennas and circuitry, a Bluetooth (e.g., BLE) antenna and circuitry, DOCSIS circuitry, ONT circuitry, and other antennas, ports, and circuitry.

As described herein, when one or more components are described as being connected, joined, affixed, coupled, attached, or otherwise interconnected, such interconnection may be direct as between the components or may be indirect such as through the use of one or more intermediary components. Also, as described herein, reference to a "member," "component," or "portion" shall not be limited to a single structural member, component, or element but can include an assembly of components, members or elements.

According to an exemplary aspect of the present disclosure, flow in a plumbing system (e.g., a residential or commercial plumbing system) may be measured and controlled by a control and monitoring system including an electronically actuated proportional control valve disposed between a water source (e.g., utility) and the plumbing system, with a controller or control module (connected to or remote from the valve) configured to automatically adjust the valve position (and a corresponding flow rate through the valve) to maintain a predetermined differential pressure (e.g., less than about 10 psi, or about 5 psi) between an upstream side of the valve and a downstream side of the valve, as measured by upstream and downstream pressure sensors.

In the absence of water usage from the plumbing system, the valve may automatically close to maintain this predetermined differential pressure between the substantially constant pressure utility water source and the substantially constant pressure local plumbing system. This closed valve condition may also prevent backflow from an over-pressurized local plumbing system.

When water flow from the plumbing system occurs (e.g., due to intentional use of one or more water fixtures, accidental or inadvertent water fixture use, or leakage from the fixtures, pipes, or connections of the plumbing system), the downstream pressure sensor detects a decrease in the downstream pressure, resulting in an increase in the measured differential pressure. A control module in communication with the upstream and downstream sensors (e.g., wired or wireless communication) may be configured to operate the valve (e.g., by transmitting control signals to an electrically operated actuator of the valve assembly) to open to a position and for a duration necessary to return the differential pressure to the predetermined setting. When water flow from the plumbing system decreases or ceases, the control module is configured to operate the valve to adjust the valve in a closing direction to maintain the predetermined differential pressure setting.

FIG. 1 schematically illustrates an exemplary monitoring and control system 5 including a proportional control valve 10 having an inlet port 11 connected with a water source U (utility side) and an outlet port 12 connected with a local plumbing system H (home side), with upstream and downstream pressure sensors 30, 40, which may be integral to or assembled (directly or indirectly) with the valve 10, positioned upstream and downstream of a flow regulating valve element 20, to measure fluid pressure upstream and downstream from the valve element (e.g., at the inlet and outlet ports 11, 12 of the valve 10). The proportional control valve 10 includes an electronically operated actuator 50 operable to adjust the valve element 20 to a range of partially open positions (i.e., providing for a range of flow rates or effective flow coefficients) between a closed position blocking flow between the inlet and outlet ports 11, 12, and a fully open position (i.e., position of maximum flow). A control module 60 is operatively connected (e.g., by wired or wireless electronic communication) with the pressure sensors 30, 40 to receive and process fluid pressure data, and with the actuator 50 to provide actuating signals for operation of the actuator to adjust the valve element to a selected flow position, between closed and fully open, for example, in response to user input or in response to sensed pressure data from the pressure sensors.

Figure 1A:
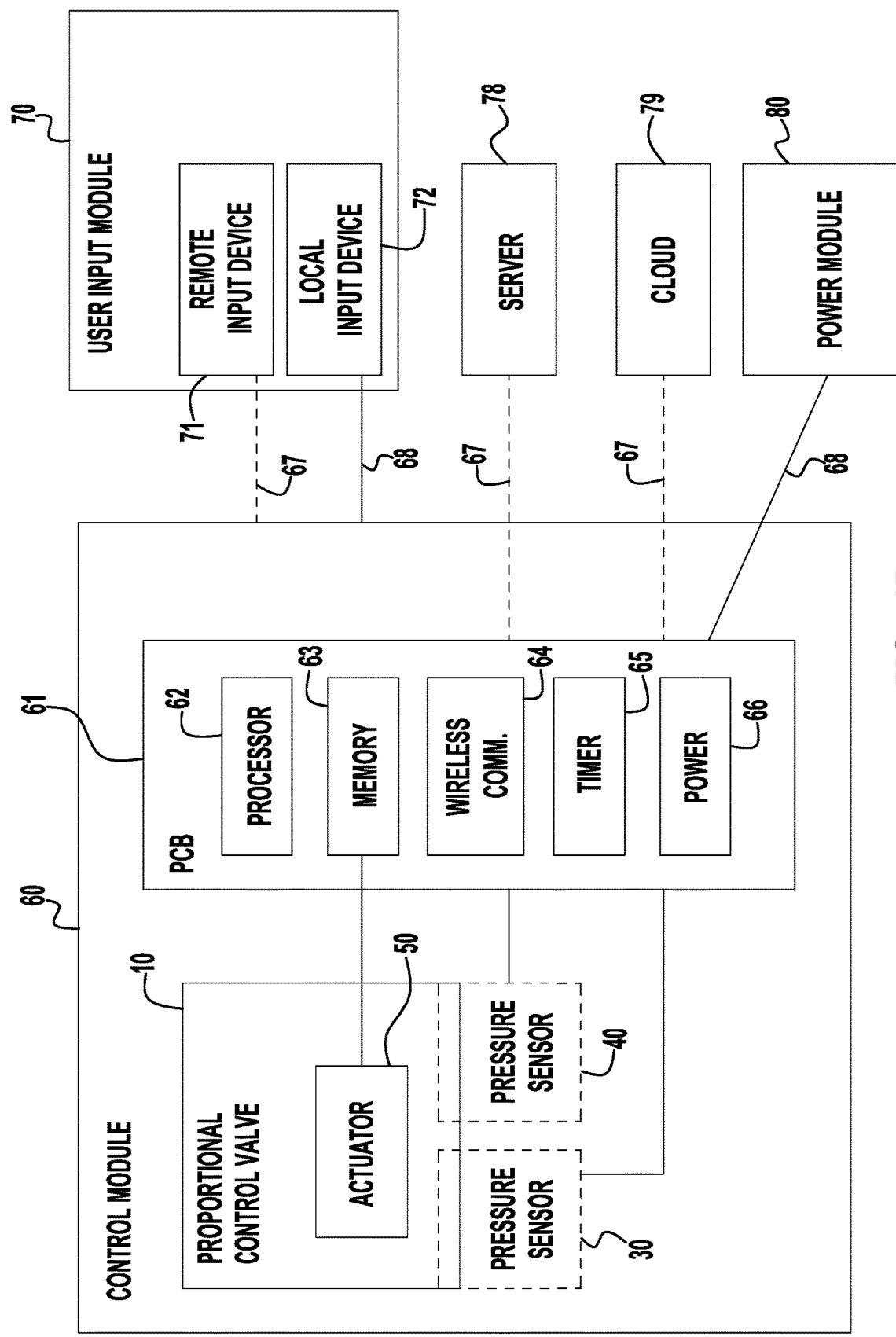
FIG. 1A is a schematic illustration of electrical/electronic components of an electronically operated proportional valve arrangement, according to an exemplary embodiment of the present disclosure.

In an exemplary embodiment, as schematically shown in FIG. 1A, the controller 60 may include a number of electronic components. These components enable the operation of the proportional control valve 10 and the monitoring of the local fluid system. More specifically, these components enable the activation, deactivation, and control of the valve 10. The controller 60 may be integrated with the proportional control valve 10, assembled with the proportional control valve, or remotely connected with the proportional control valve (e.g., using wired or wireless communication). The controller 60 may include one or more printed circuit boards ("PCBs") 61. In the illustrated example, a number of electronic components are mounted on the PCB 61, including, but not limited to, a processor 62, memory 63, a wireless communication chip 64, a timer 65, and a power port 66. The processor 62 receives signals from and sends signals to the electronically operated actuator 50 to control operation of the valve 10. For example, the processor 62 receives signals from sensors 30, 40 (described above and to be described in greater detail below) and sends signals to the electronically operated actuator 50 to activate, deactivate, and control the valve 10. The timer 66 measures time intervals and instances for these actions, for example, for storage or communication with corresponding measured parameters (e.g., pressure, valve position) or other actions.

The memory 63 can save information received from the sensors 30, 40 and the actuator 50. The information can also be saved in remote memory. Exemplary storage locations for the remote memory include a user input module 70 (e.g., a smartphone, tablet, or computer), a centralized server provided by the valve/control module manufacturer or other service provider, and/or a cloud service provided by the valve/control module manufacturer or a third party provider (such as Google®, HomeKit®, and IFTTT®). In the illustrated example, examples of the remote memory includes a server 78 and a cloud computing network 79.

In the illustrated example, the user input module 70 may provide operational instructions to the control module 60. The user input module 70 can be any module that enables user input. The user input module 70 may include one or more remote input device(s) 71 and manual input device(s) 72. Exemplary electronic input devices 71 include activation sensors, mobile devices, voice controlled devices, and touch screen devices, such as, for example, a smart phone, smart speaker, computer, or tablet. Exemplary manual input devices 72 include buttons, touchpads, and toggle switches connected with the valve 10 and/or control module 60. The user input module 70 receives input from a user and sends signals to the control module 60 to control operation of the valve 10. For example, the user input module 70 receives input from a user and sends signals to the processor 62 to activate, deactivate, and control the valve 10. In the illustrated embodiments, some components of the user input module 70 (e.g., a mobile device or voice controlled device) are connected to the control module 60 via a wireless communication connection 67 (such as a Wi-Fi connection with wireless communication chip 64) for wireless signal transmission, while other components of the user input module 70 (e.g., the local input device) are connected to the control module 60 via a hard-wired connection 68 for wired signal transmission. In other arrangements, each component of the user input module 70 could be connected to the control module 60 and send signals to and/or receive signals from the processor 62 via any type of connection, including other wireless communication connections, such as Bluetooth, cellular, near field communication (NFC), Zigbee, and Z-Wave, or a hard-wired connection. The user input module 70 could include any number of components. Moreover, each component of the user input module 70 could be in any location where it can send signals to and/or receive signals from the control module 60 and/or other electronic components of the proportional control valve 10, such as the processor 62, or each component of the user input module 70 could be integrally formed with or physically connected to the valve 10 and/or control module 60.

In the illustrated embodiment, a power module 80 provides power to the electrical/electronic components of the control module 60. In the illustrated embodiment, the power module 80 is connected to the power port 66 of the control module 60 via a hard-wired connection 68. The power module 80 may include a variety of power sources, including, for example, AC power, battery power, or AC power with a battery backup.

During user operation of the electronic valve 10, the user activates, deactivates, and controls the electronic valve 10 using one or more components of the user input module 70. For example, the user could operate the user input module 70 by triggering an activation sensor/switch 73 on the valve 10 or control module 60, pressing an appropriate button or touchscreen prompt on the mobile device 74, and/or vocalizing specific commands (e.g., device programmed voice prompts, such as "turn on" and "turn off") to the voice controlled device 75.

According to an aspect of the present disclosure, the proportional control valve may be automatically adjusted by the control module, using control logic to adjust the valve (e.g., in an opening or closing direction) to reach a valve position at which an equilibrium is reached to maintain the differential pressure at the predetermined setting. For example, with the valve element 20 in the closed position, at each time increment (e.g., every 500 ms), the control module 60 may analyze pressure measurements from the upstream and downstream pressure sensors 30, 40, comparing the corresponding pressure differential with the predetermined differential pressure setting (e.g., less than about 10 psi, or about 5 psi). Upon detection of a differential pressure greater than the predetermined setting, the control module 60 may be configured to adjust the valve in the opening direction to supply more water to the plumbing system, thereby increasing the downstream pressure and decreasing the differential pressure. Subsequent measurements of differential pressures may cause the control module to further adjust the valve element flow position, adjusting the valve element in the opening direction to supply more water to the plumbing system H when a differential pressure greater than the predetermined setting is detected (to further increase the downstream pressure and decrease the differential pressure), and adjusting the valve in the closing direction to supply less water to the plumbing system when a differential pressure smaller than the predetermined setting is detected (to decrease the downstream pressure and increase the differential pressure), until the predetermined differential pressure setting is reached.

In this adjusted flow position of the valve element 20 corresponding to the predetermined pressure differential setting, instantaneous water usage within the plumbing system may be identified as corresponding to the flow rate through the valve 10. As such, to determine water usage, the control module 60 may be configured to determine the flow rate through the valve 10, based on the upstream and downstream pressures and the valve element position (corresponding to a known effective flow coefficient, Cv), for example, by using lookup tables or flow rate calculations (e.g., $Q=Cv\sqrt{\Delta p}$) stored in or otherwise accessible by the control module 60.

When water usage in the plumbing system H ceases, the control module 60 will automatically move the valve element to the closed position, in response to reduced differential pressure measurements corresponding to the ceased water usage.

The use of a control module operated proportional control valve may provide additional features and advantages. For example, the control module may be configured to maintain the valve in a closed position when the upstream (utility) pressure exceeds a predetermined threshold, for example, to protect the plumbing system from over-pressurization. As another example, communication between the control module and a remote device (e.g., a smartphone) may allow for remote user control of the valve, for example, allowing the user to close the valve while away from home (for example, in response to a notification of unexpected water usage or a potential leak). As still another example, the control module may be configured to control the rate at which the valve opens and closes, for example, to reduce or prevent a water hammer effect.

As another example, the control module may be configured to adjust the pressure differential setting, for example, to provide for increased or decreased water pressure within the plumbing system. For example, the pressure differential setting may be increased to reduce the water pressure in the plumbing system during periods of low or no water usage (e.g., overnight or in a vacation mode), for example, to extend fixture life or reduce likelihood of failure of a water fixture. As another example, the pressure differential setting may be decreased to increase the water pressure during periods of high water demand (e.g., outdoor irrigation, filling a pool or hot tub).

The range of valve positions may be calibrated to correlate a flow coefficient for each valve position, such that the control module is able to calculate, based on the upstream pressure, the downstream pressure, and the valve position (and its corresponding flow coefficient), the flow rate through the valve, and correspondingly, the amount of water flowing from the local plumbing system (e.g., due to usage of one or more water fixtures or leakage from one or more leak points in the system) and a total amount of water used (as an integral of flow vs. time).

While many different types of proportional control valves may be utilized, in an exemplary embodiment, a valve having fine metering capabilities and a wide range of flow settings may be selected to facilitate more precise measurement of flow rate through the valve, with a turndown ratio (ratio of maximum capacity to minimum capacity) of at least 100, or at least 200, or at least 500. In an exemplary embodiment, an electronically actuated proportional control valve may be configured to be precisely controlled to provide a range of flow coefficients (Cv), having a minimum Cv of no greater than about 0.03 and a maximum (e.g., fully open) Cv of at least about 5.0. For example, an electronically actuated proportional control valve may be configured to be precisely controlled to provide a range of flow rates, at a pressure differential of about 5 psi, having a minimum flow rate of no greater than about 0.05 gpm and a maximum (e.g., fully open) flow rate of at least about 11.3 gpm, for a turndown ratio of approximately 226. In such an arrangement, the monitoring system may be able to measure water usage/leakage as low as 0.05 gpm and as high as 11.3 gpm.

Conventional flowmeters, as used, for example, by a municipal water department, are typically unable to detect water usage when the flow rate is less than about 0.25 gpm. The ability to measure extremely low water usage rates may advantageously allow a municipality or other entity to detect and measure low water usages that would otherwise go undetected by a conventional positive displacement flow meter, for example, to properly assign the costs associated with providing and processing this otherwise unbilled water.

Figure 2:
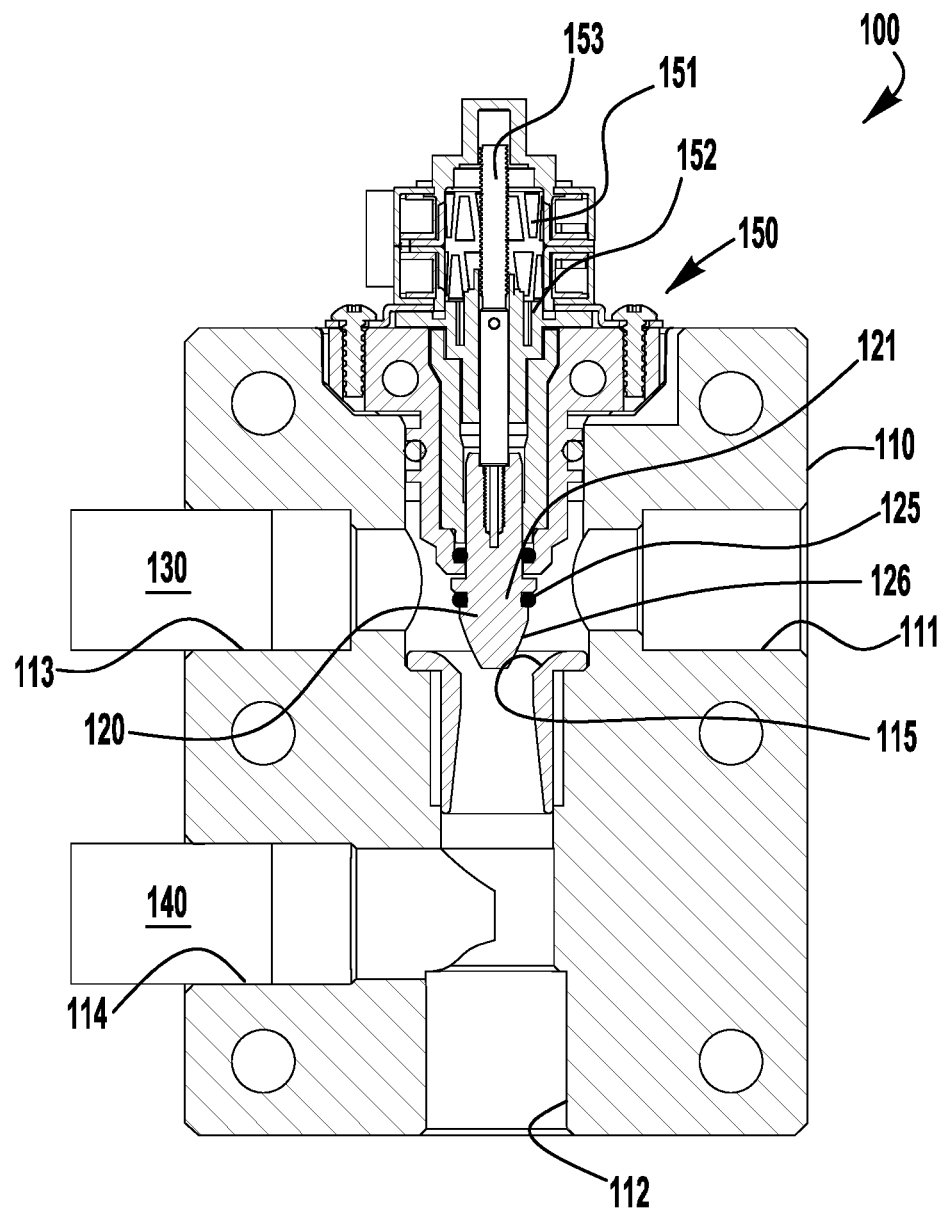
FIG. 2 illustrates a cross-sectional view of a proportional control valve, according to an exemplary embodiment of the present disclosure.

FIG. 2 illustrates an exemplary embodiment of a proportional control valve assembly 100 including a valve body 110 having an inlet port 111 and an outlet port 112, a valve element 120 assembled with the valve body and disposed between the inlet port and the outlet port, and an electronically operated actuator 150 assembled with the valve body and operable to adjust the valve element to a plurality of flow positions between a closed position and a fully open position (i.e., a position of maximum flow which may, but need not be a limit position of the valve element). The valve body 110 also includes a first pressure port 113 for receiving a first or upstream pressure sensor (shown schematically at 130) in fluid communication with the inlet port 111, and a second pressure port 114 for receiving a second or downstream pressure sensor (shown schematically at 140) in fluid communication with the outlet port 112.

While many different types of valve elements may be utilized, in the illustrated embodiment, the valve element 120 includes an axially movable stem 121 having an annular sealing portion 125 (e.g., an o-ring/gasket seal) that seals against an annular valve seat 115 in the valve body 110 when the valve stem 121 is in the closed position, and a tapered stem tip 126 providing a range of flow conditions as the valve stem is adjusted between the closed position and the fully open position.

While many different types of electronically operated actuators may be utilized, in the illustrated embodiment, the electronically operated actuator 150 includes a stepper motor 151 operated, for example, by actuating signals transmitted from a processor, and having an internally threaded rotor 152 that is rotated for axial movement of a rotationally fixed shaft 153 attached to the valve stem 121 (e.g., by a reverse threaded connection) for axial movement of the valve stem without rotation of the valve stem.

Many different valve body and valve element configurations may be utilized. In the valve assembly 100 of FIG. 2, the upstream port 111 is perpendicular to the axial travel of the valve element 120, and the downstream port 112 is coaxial with the valve element. In other embodiments, the axis of the valve sealing member may be angled with respect to the inlet and outlet ports (e.g., at an angle between about 40° and about 50° with respect to the inlet port), for example, to allow the valve to be installed on residential water main in a straight run of pipe without the need for a separate waterhorn or plumbing to reroute the discharge of valve back on axis, to minimize noise/pressure loss across the valve by maintaining the straightest possible flow path, and/or to reduce the overall height of the valve.

Figure 3:
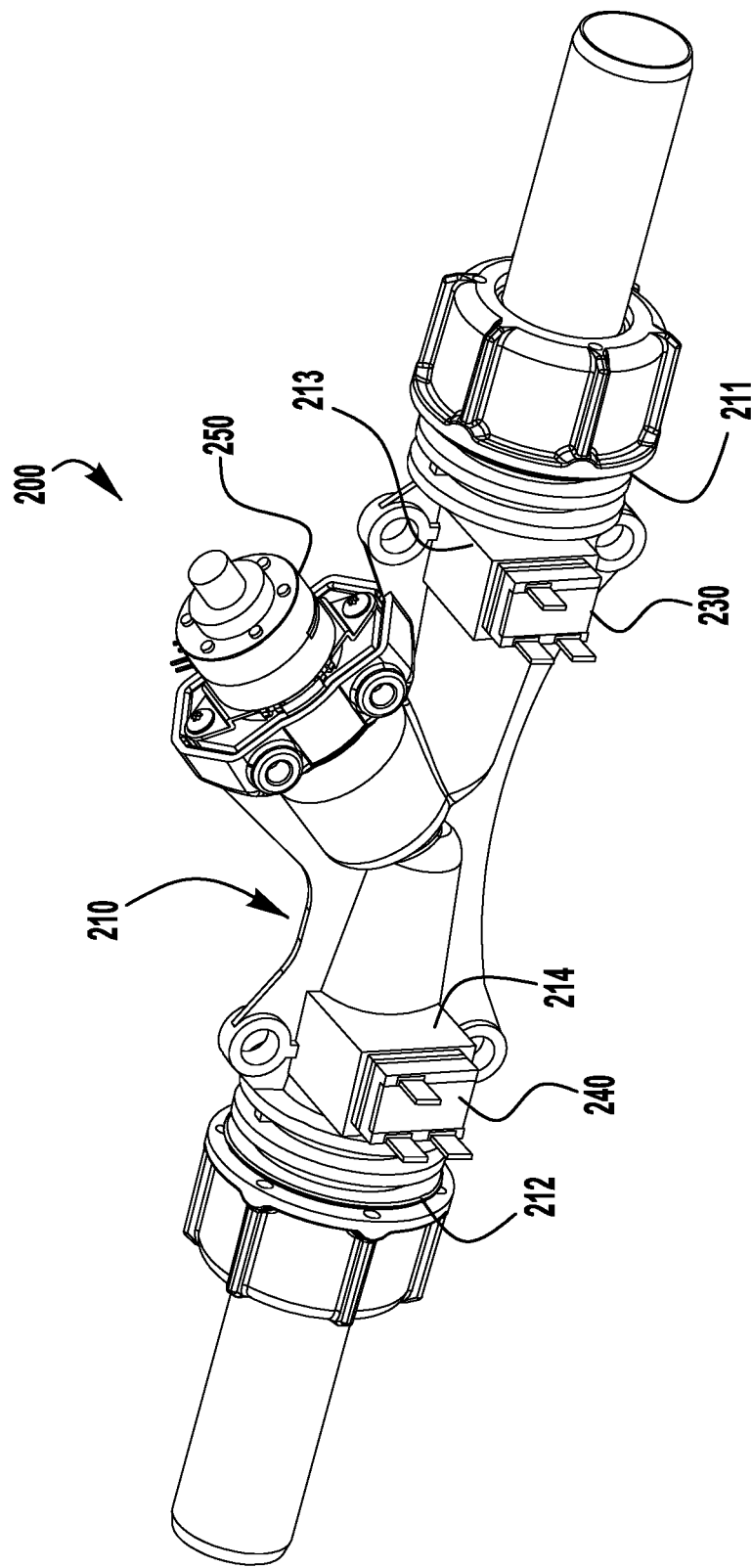
FIG. 3 illustrates a perspective view of another proportional control valve, according to an exemplary embodiment of the present disclosure.
Figure 4:
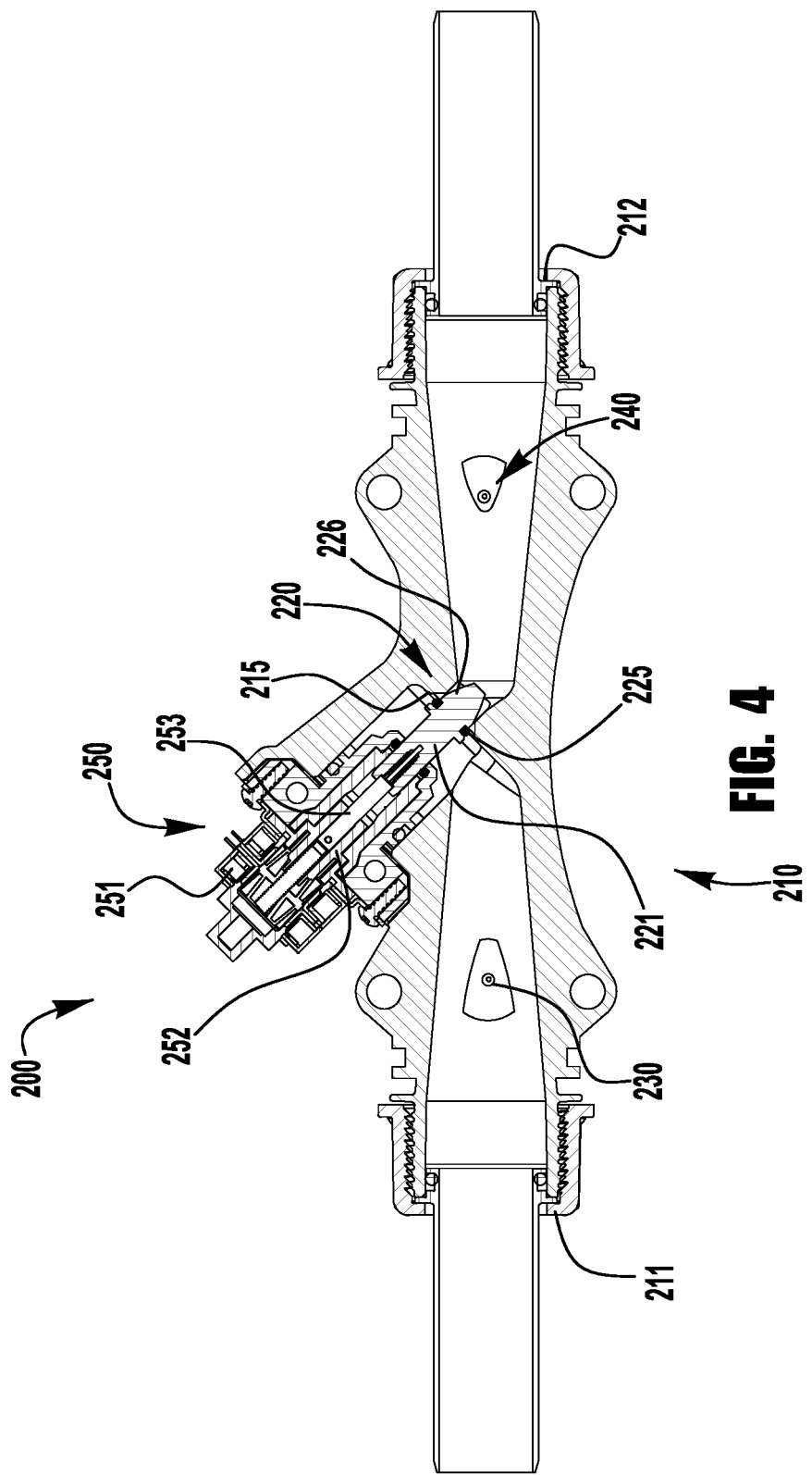
FIG. 4 illustrates cross-sectional view of the proportional control valve of FIG. 3, shown with the valve stem in a closed position.
Figure 5:
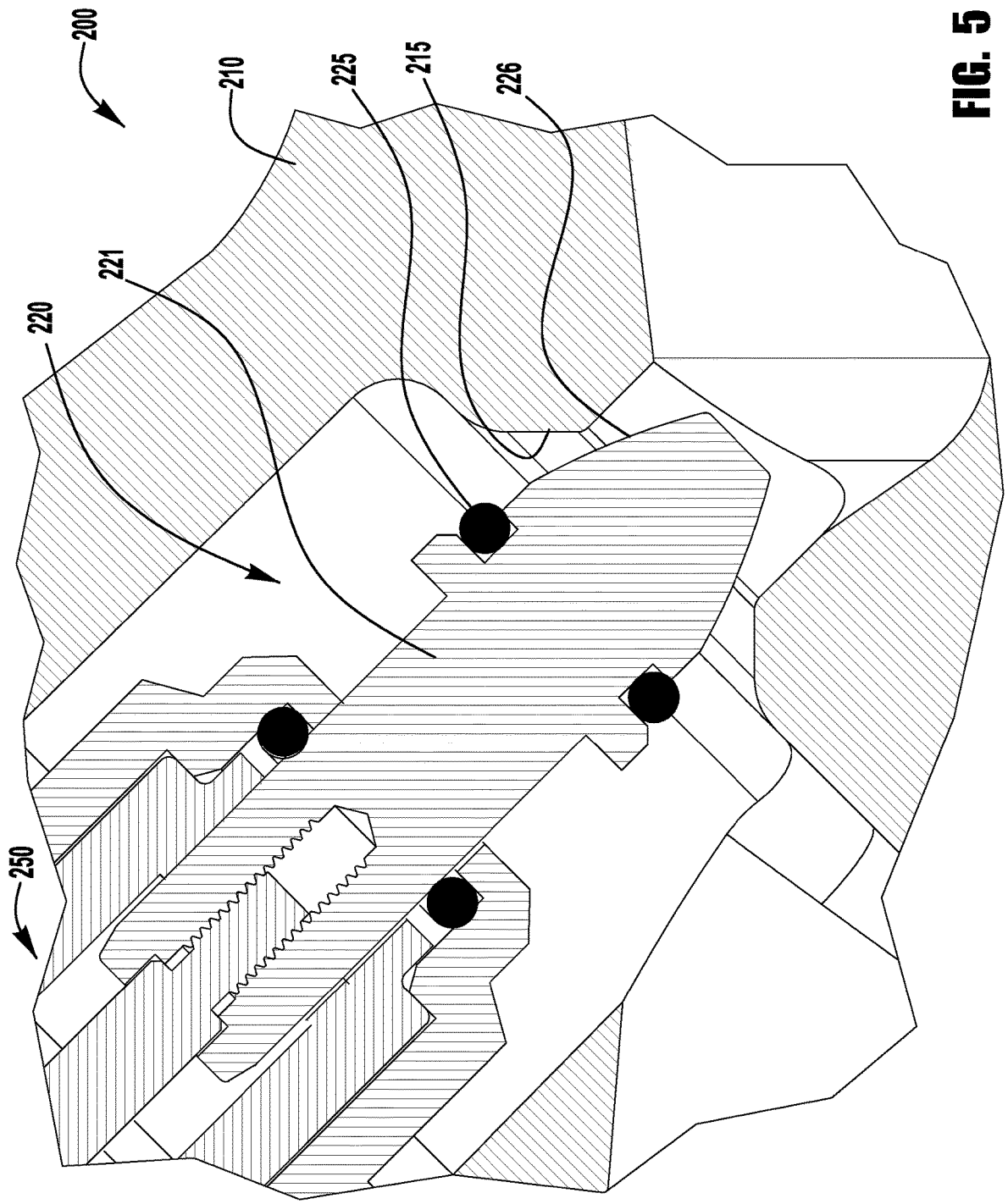
FIG. 5 illustrates an enlarged cross-sectional partial view of the proportional control valve of FIG. 3, shown with the valve stem in an open position.

FIGS. 3-5 illustrate an exemplary embodiment of a proportional control valve assembly 200 including a valve body 210 having an inlet port 211 and an outlet port 212, and a valve element 220 assembled with the valve body, between the inlet port and the outlet port, and oriented at an angle with respect to the inlet port (e.g., about 45°). An electronically operated actuator 250 (e.g., the stepper motor arrangement described herein) is assembled with the valve body 210, operatively connected with the valve element 220, and operable to adjust the valve element to a plurality of flow positions between a closed position and a fully open position (i.e., a position of maximum flow which may, but need not be a limit position of the valve element). The valve body 210 also includes a first or upstream pressure sensor 230 installed in a first pressure port 213 in the valve body and in fluid communication with the inlet port 211, and a second or downstream pressure sensor 240 installed in a second pressure port 214 in the valve body and in fluid communication with the outlet port 212.

The valve element 220 includes an axially movable stem 221 having an annular sealing portion 225 (e.g., an o-ring/gasket seal) that seals against an annular valve seat 215 in the valve body 210 when the valve stem 221 is in the closed position, and a tapered stem tip 226 providing a range of flow conditions (e.g., a Cv between about 0.02 and about 5.07, or a flow rate between about 0.05 gpm and about 11.34 gpm at a differential pressure of about 5 psi) as the valve stem is adjusted between the closed position and the fully open position. The electronically operated actuator 250 includes a stepper motor 251, operated, for example, by actuating signals transmitted from a processor, and having an internally threaded rotor 252 that is rotated for axial movement of a rotationally fixed shaft 253 attached to the valve stem 221 (e.g., by a reverse threaded connection) for axial movement of the valve stem without rotation of the valve stem.

Figure 6:
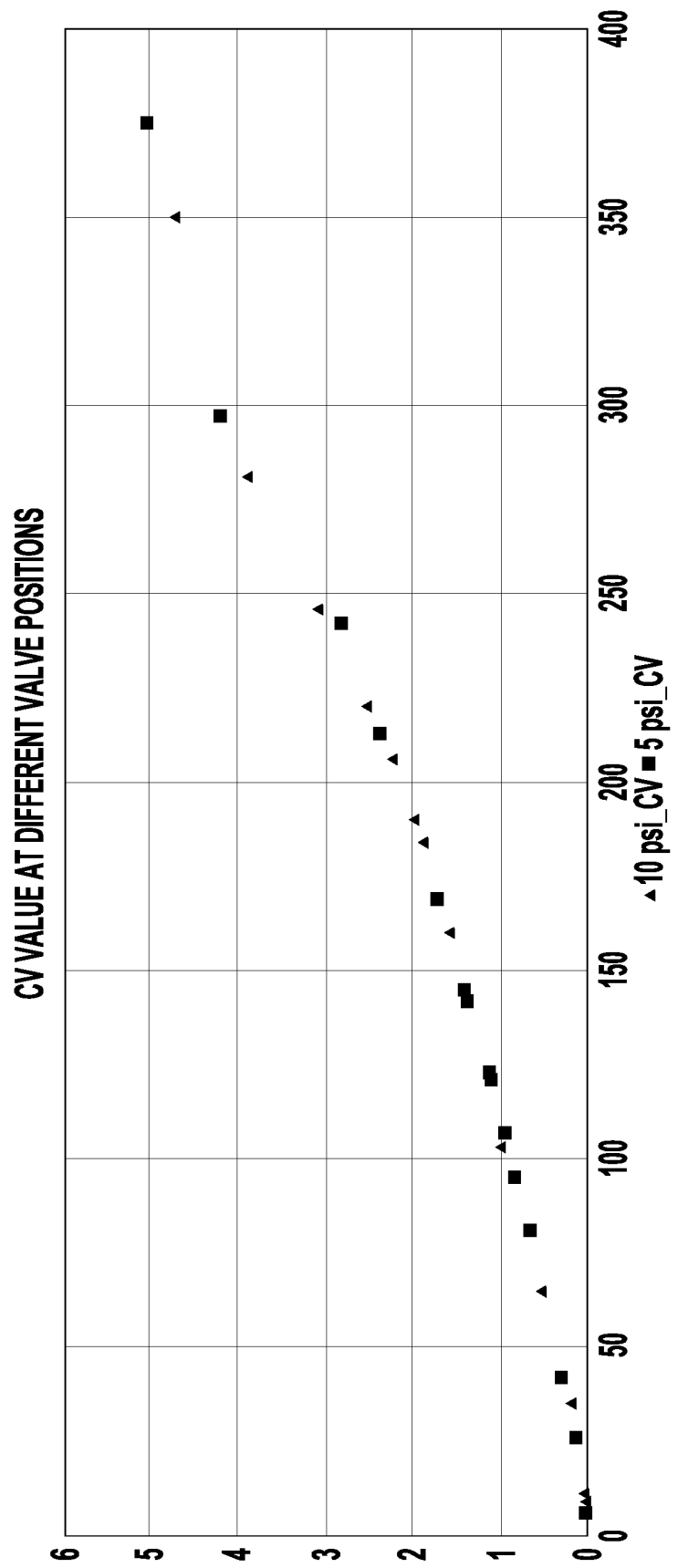
FIG. 6 illustrates a Cv vs. valve stroke curve for an exemplary proportional control valve.
Figure 7:
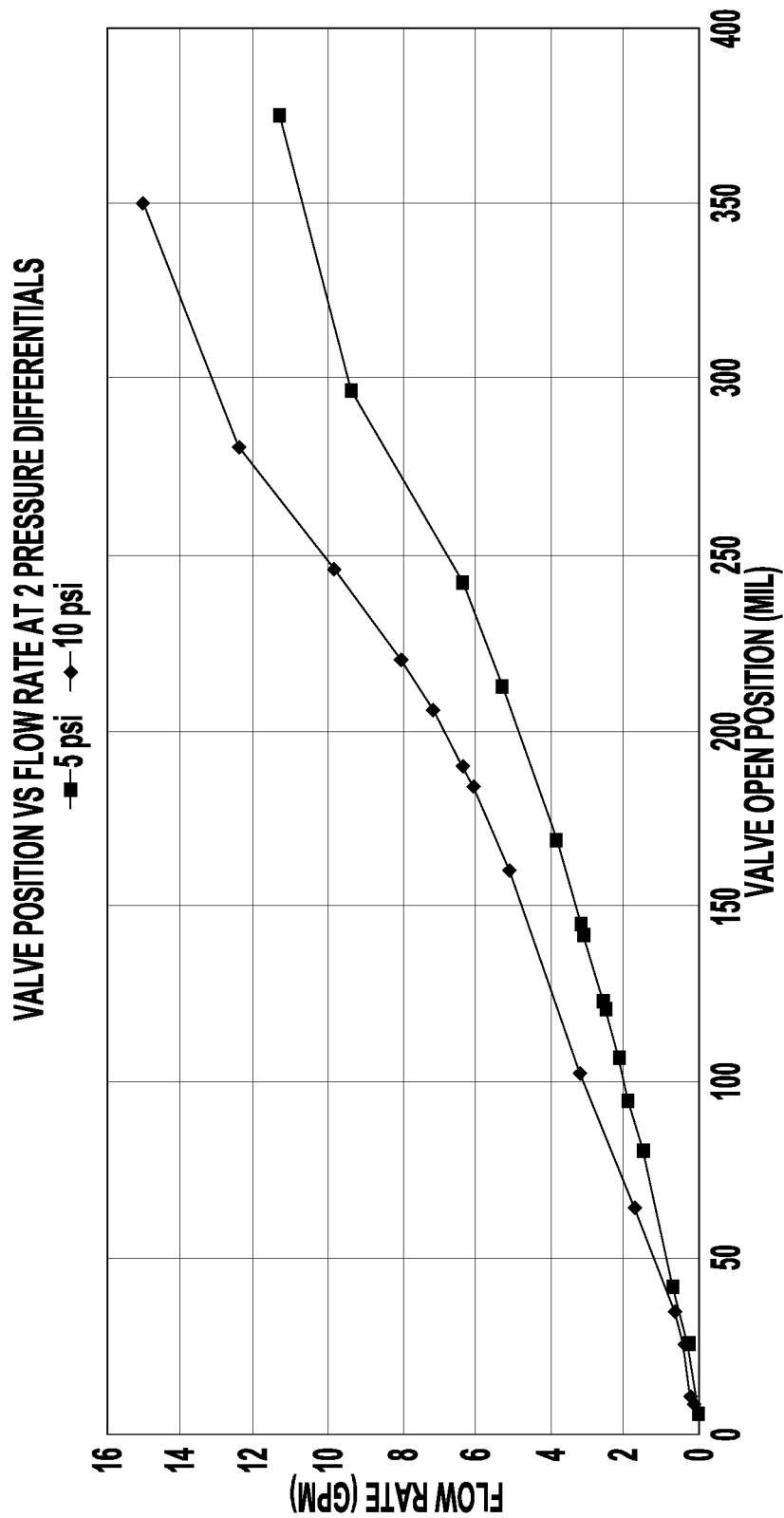
FIG. 7 illustrates a flow rate vs. valve stroke curve for an exemplary proportional control valve.

In an exemplary embodiment, the electronically operated actuator 250 may be configured to move the valve stem in increments small enough to provide for very small differences in valve flow rate, such that the processor can measure and identify correspondingly small differences in water usage. While a wide range in resolutions in incremental flow change may be selected as appropriate, in an exemplary embodiment, the electronically operated actuator 250 may be configured to move the valve stem 220 in increments of about 0.001". In an exemplary embodiment, the electronically operated actuator 250 may be configured to move the valve stem 220 in 0.001" increments over a total stroke of about 0.375", with a full flow or fully open condition substantially achieved at a valve stroke of about 0.350". FIG. 6 illustrates a valve Cv vs. valve stroke curve for an exemplary proportional control valve of the present disclosure. FIG. 7 illustrates a corresponding flow vs. valve stroke curve for the exemplary valve in a system with differential pressure settings of about 5 psi and about 10 psi.

In some embodiments, the proportional control valve may be configured to reduce power consumption by reducing the force required to actuate the valve element, for example, by reducing resistance to axial movement of the valve element by the system fluid. In one such arrangement, the valve element may include downstream radial surfaces exposed to fluid pressure imparting an upstream (i.e., positive pressure) biasing forces configured to offset or substantially balance with downstream (i.e., backpressure) biasing forces imparted by fluid pressure acting on upstream radial surfaces of the valve element. This offsetting or balancing of upstream and downstream biasing forces may allow for use of a lower energy (and potentially lower cost) motor that enables the possibility of a battery backup, for example, to significantly reduce the cost and power requirements, and/or allow for extended operation in the event of a power outage. This pressure balanced valve element design may also reduce or eliminate hysteresis in the valve (e.g., due to deformation caused by prolonged closing forces on the valve sealing element) and enable repeatable high precision actuation of the valve.

Figure 8:
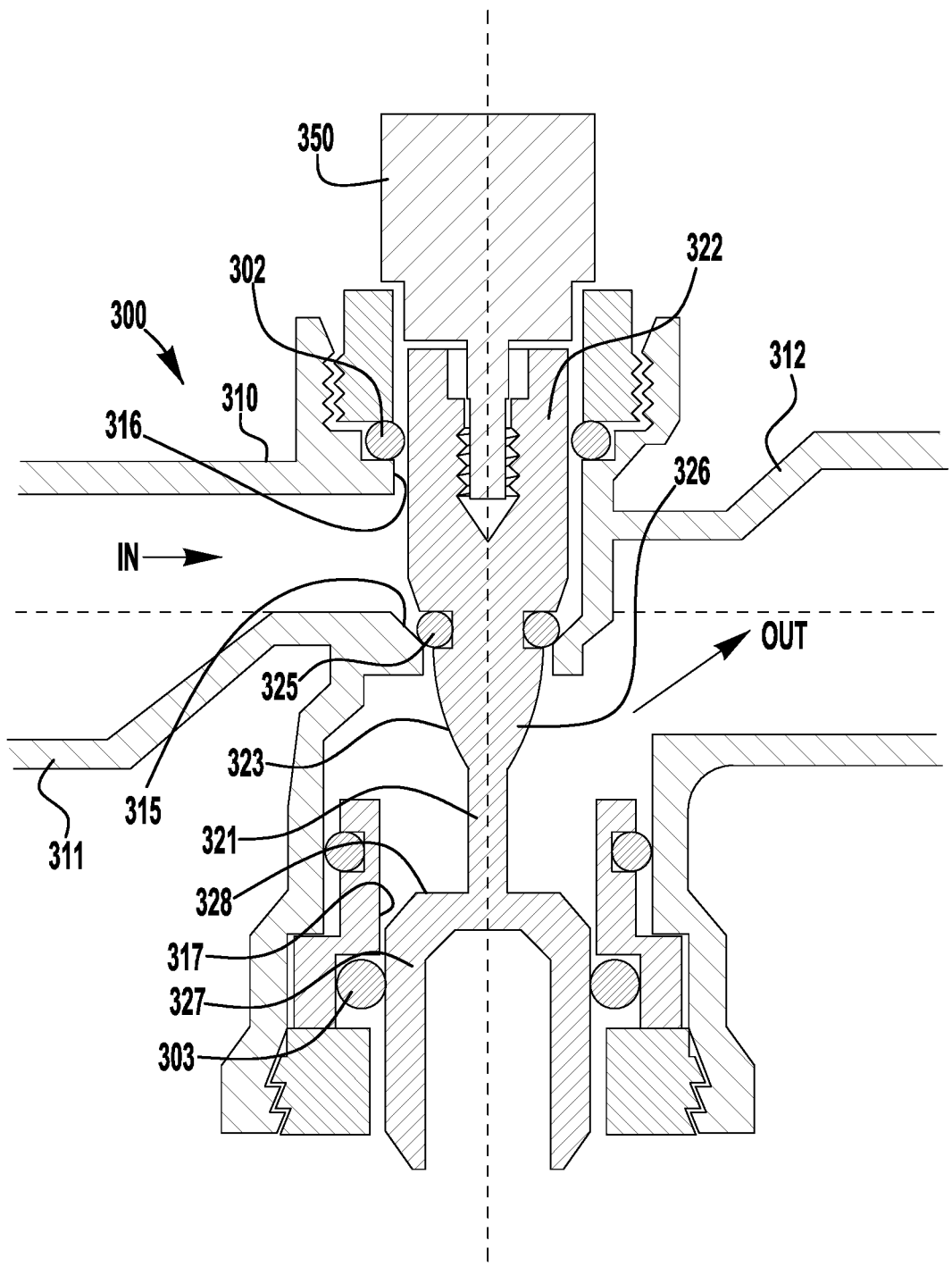
FIG. 8 illustrates another actuated proportional control valve, according to an exemplary embodiment of the present disclosure.

FIG. 8 illustrates an exemplary proportional control valve assembly 300 including a valve body 310 having an inlet port 311 and an outlet port 312 (which may be in fluid communication with upstream and downstream pressure sensors, not shown), and a pressure balanced valve element 320 assembled with the valve body, between the inlet port and the outlet port (e.g., substantially perpendicular to the inlet and outlet ports, or at any other suitable orientation). An electronically operated actuator, shown schematically at 350 (e.g., the exemplary stepper motor arrangement described herein) is assembled with the valve body 310, operatively connected with the valve element 320, and operable to adjust the valve element to a plurality of flow positions between a closed position and a fully open position (i.e., a position of maximum flow which may, but need not be a limit position of the valve element).

The pressure balanced valve element 320 includes an axially movable stem 321 having an annular sealing portion 325 (e.g., an o-ring/gasket seal) that seals against an annular valve seat 315 in the valve body 310 when the valve stem 321 is in the closed position, and a tapered stem portion 326 providing a range of flow conditions as the valve stem is adjusted between the closed position and the fully open position. The stem 321 includes an upstream piston portion 322 received in an upper bore 316 of the valve body 310, and sealed by gasket seal 302, and a downstream piston portion 327 received in a lower bore 317 of the valve body, and sealed by gasket seal 303. The radially extending portions of the annular sealing portion 325 and tapered stem portion 326 define upstream radial surfaces 323 of the upstream piston portion 322, and the downstream piston portion 327 defines corresponding downstream radial surfaces 328. When the valve 300 is in service, the downstream radial surfaces 328 are exposed to fluid pressure imparting positive pressure or valve opening biasing forces configured to offset or substantially balance with backpressure or valve closing biasing forces imparted by fluid pressure acting on upstream radial surfaces 323 of the valve stem 321. This offsetting or balancing of opening and closing biasing forces may allow for use of a lower energy (and potentially lower cost) motor or other such actuating mechanism that facilitates the use of a battery backup, for example, to significantly reduce the cost and power requirements, and/or allow for extended operation in the event of a power outage.

Figure 9:
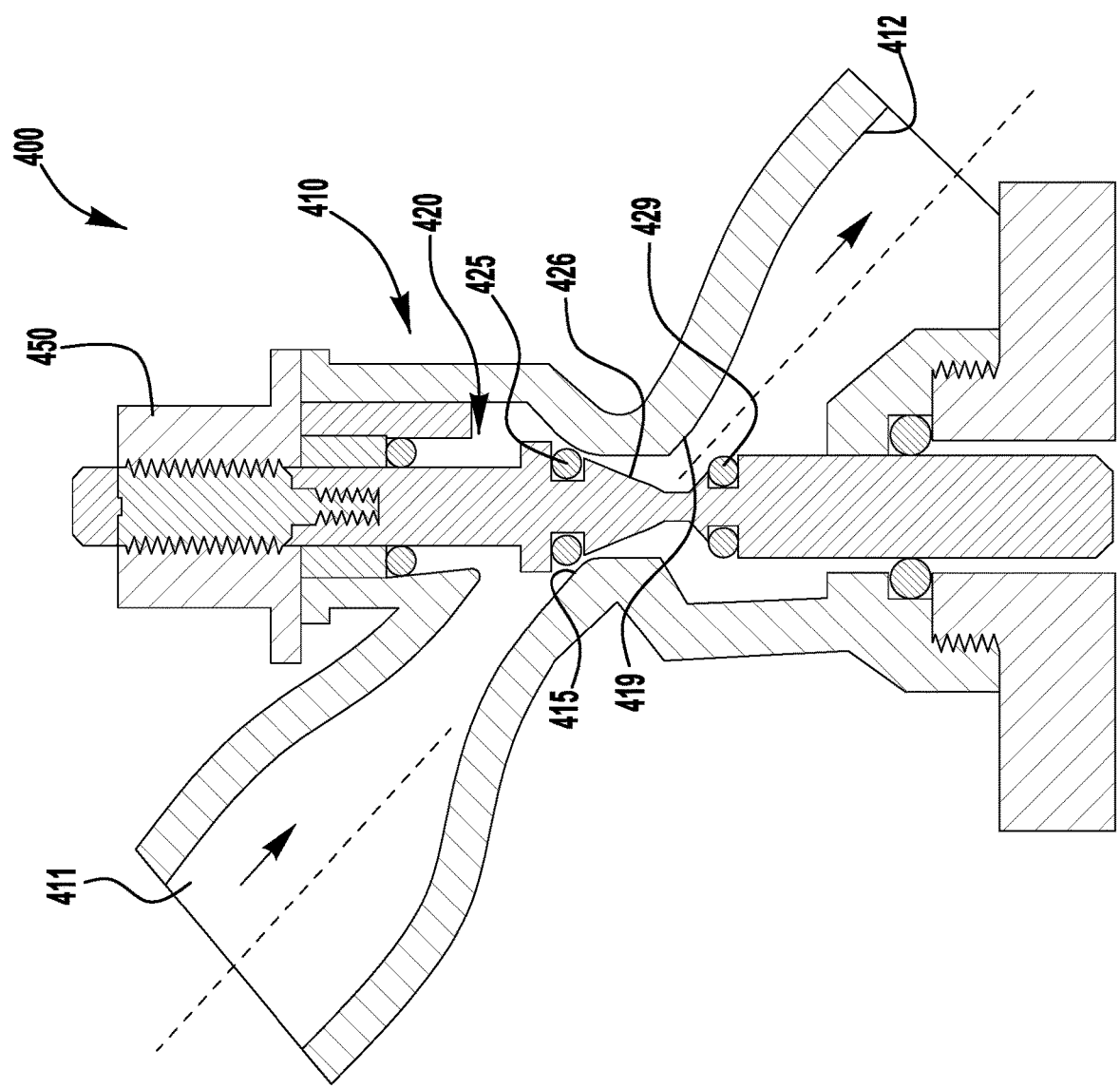
FIG. 9 illustrates another actuated proportional control valve, according to an exemplary embodiment of the present disclosure.

In the embodiments of FIGS. 2-5 and 8, the valve element 120, 220, 320 provides a closed condition at a first limit position and a fully open condition (i.e., position of maximum flow) at a second limit position. In other embodiments, the valve element may be configured to provide a valve closed condition at both actuation limits, for example, to provide a fail-safe position in the event of an over-pressurization of the plumbing system, or failure of the actuator (e.g., with a spring return to a closed position in the event of power loss). FIG. 9 illustrates an exemplary proportional control valve assembly 400 including a valve body 410 having an inlet port 411 and an outlet port 412 (which may be in fluid communication with upstream and downstream pressure sensors, not shown), and a dual seal valve element 420 assembled with the valve body, between the inlet port and the outlet port, and oriented at an angle with respect to the inlet port (e.g., about 45°). An electronically operated actuator 450 (e.g., the exemplary stepper motor arrangement described herein) is assembled with the valve body 410, operatively connected with the valve element 420, and operable to axially adjust the valve element 420 to a plurality of flow positions between a first closed position, in which a first annular sealing portion 425 (e.g., an o-ring/gasket seal) of the valve element seals against a first annular valve seat 415 in the valve body 410 and a second closed position, in which a second annular sealing portion 429 (e.g., an o-ring/gasket seal) of the valve element seals against a second annular valve seat 419 in the valve body 410. A tapered stem portion 426 provides a range of flow conditions as the valve stem is adjusted between the first and second closed positions.

According to another aspect of the present disclosure, a water usage monitoring system, for example, utilizing software stored on the control module or provided in a remote software-based or web-based application (e.g., on a smartphone or computer), may analyze water usage data as measured by the control module based on, for example, the difference between upstream and downstream pressures and the calibrated valve position to identify water usage conditions within the local plumbing system, as described above. The water usage monitoring system may communicate water usage data (e.g., flow rate, flow rate over time, total water used) as well as other system conditions (e.g., upstream or downstream pressure) to an end user, for example, using a smart phone application or a display connected to or remote from the control valve apparatus.

The water usage monitoring system may additionally store water usage signature data, either programmed into or learned by the monitoring system, for correlation of detected water usage to a stored signature corresponding to one or more of the water fixtures within the plumbing system. The water usage signature data may identify one or more water usage properties, such as, for example, instantaneous flow rate, flow rate over time, flow rate relative to pressure, flow duration, and total water used in a water usage event. By correlating the detected water usage to a stored water usage signature, the monitoring system may identify to the end user the occurrence and type of water usage event (e.g., to identify to the user a faucet left on or a toilet stuck running) or the total water usage for this event type over time (e.g., to advise the user of opportunities to reduce water consumption). The monitoring system may also identify potential leaks, for example, where water usage data does not correlate to any known signatures for water fixtures within the plumbing system, or where the water usage data is consistent with a leakage condition (e.g., a large, rapid pressure drop consistent with a burst pipe). Where water usage data indicates a potential leak or undesired usage of a water fixture (e.g., faucet left running), the control module may be configured to automatically close the control valve, for example, to prevent water damage or unnecessary/undesired water usage.

Figure 10:
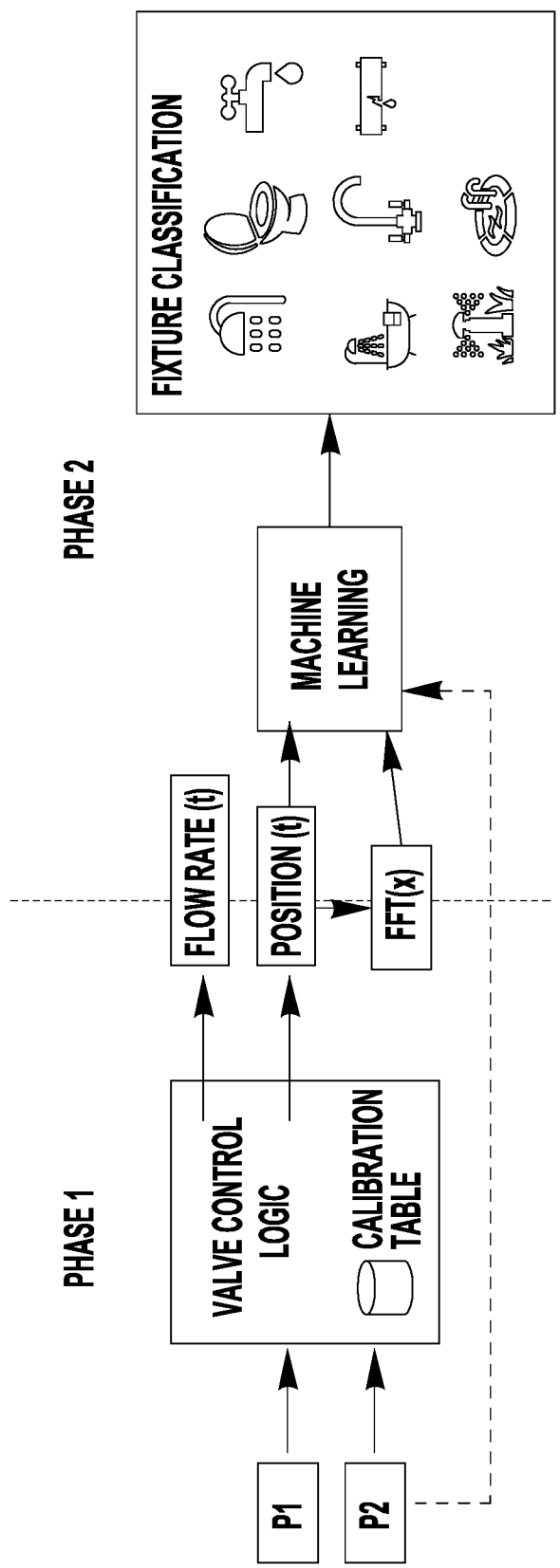
FIG. 10 is a schematic illustration of a water usage monitoring and control system, according to an exemplary embodiment of the present disclosure.

FIG. 10 schematically illustrates an exemplary water usage monitoring and control system including control logic (phase 1) for controlling the valve position based on sensed upstream and downstream pressure, and stored valve position calibration data, and machine learning logic (phase 2) for identifying and assigning flow signature data to one or more water fixtures within the plumbing system.

Figure 11:
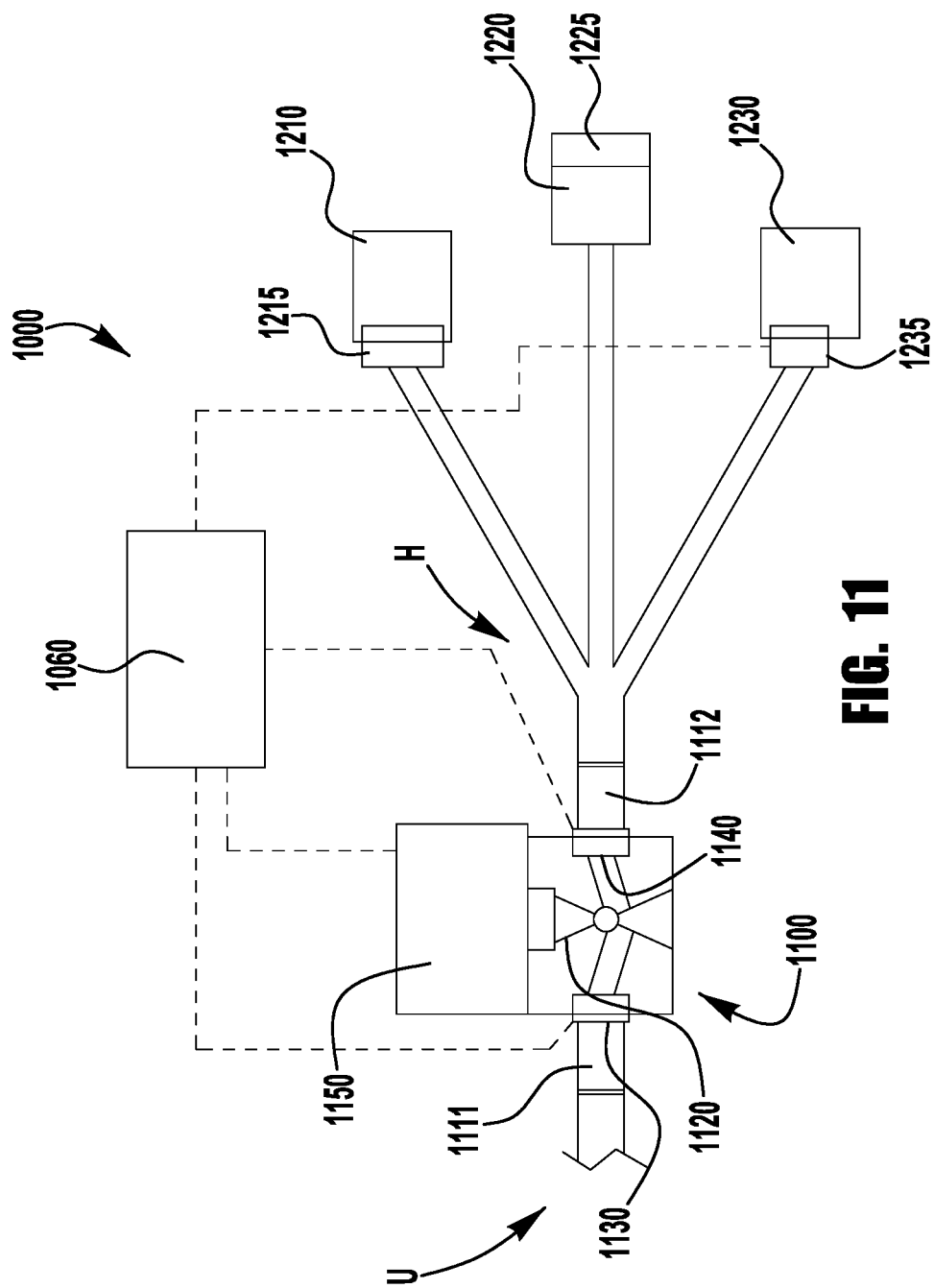
FIG. 11 is a schematic illustration of a water usage monitoring and control system, according to an exemplary embodiment of the present disclosure.

FIG. 11 schematically illustrates an exemplary water usage control and monitoring system 1000 including a proportional control valve 1100 (e.g., any of the exemplary valves described herein) having an inlet port 1111 connected with a water source U (utility side) and an outlet port 1112 connected with a local plumbing system H (home side), with upstream and downstream pressure sensors 1130, 1140, an electronically operated actuator 1150 operable to adjust a valve element 1120 to a range of partially open positions (i.e., providing for a range of flow rates or effective flow coefficients) between a closed position and a fully open position. A control module 1060 is operatively connected (e.g., by wired or wireless electronic communication) with the pressure sensors 1130, 1140 to receive and process fluid pressure data, and with the actuator 1150 to provide actuating signals for operation of the actuator to adjust the valve element to a selected flow position, between closed and fully open, for example, in response to user input or in response to sensed pressure data from the pressure sensors.

The local plumbing system H includes a plurality of water fixtures 1210, 1220, 1230 (e.g., one or more faucets, showers, toilets, appliances, etc.) connected with outlet port 1112 of the proportional control valve 1100, and may be normally closed to contain pressurized water within the pipes of the local plumbing system H.

According to another aspect of the present disclosure, the water fixtures 1210, 1220, 1230 of a plumbing system H may be configured or adapted to produce distinct, detectable water flow characteristics (i.e., a "passive marker" for that water fixture) during use, such that use of a particular water fixture may be identified as such by the water usage monitoring system as corresponding to a stored signature assigned to that water fixture. Some fixtures may inherently produce a recognizable and distinct water usage signature, such as, for example, a flushed toilet, which would produce a predictable flow rate (e.g., 2-3 gpm) for a predictable duration (e.g., 45-90 seconds). For other water fixtures subject to user variable operation, such as showers or faucets, a flow or pressure altering device may be assembled with or incorporated into the water fixture to alter the flow or pressure characteristics in such a way that a distinct water usage signature is produced. In some applications, different flow/pressure altering devices may be used with hot and cold water lines of a shower or faucet to distinguish between use of hot and cold water at the shower/faucet.

As part of the storage and identification of water usage signatures, the system may employ an initialization procedure by which water signature data is measured, recorded, and associated with a corresponding water fixture. In one such initialization process, a user may be prompted (e.g., through an application on a smartphone or other mobile device, or on a touchscreen of a control module) to turn on a water fixture in the plumbing system, and to enter a user recognizable name for the water fixture in use (e.g., "master bathroom sink," "guest bathroom toilet"). While the water fixture is turned on, the control module measures and records flow-related data (e.g., flow rate, duration, pressure, flow vs. time curve) corresponding to this water fixture use to generate the water usage signature, and associates the water fixture name with this water usage signature. Where a water fixture is provided with a flow/pressure altering device, as described in greater detail below, the system may additionally or alternatively prompt the user for entry of an identification code (e.g., by bar code scanning, serial code key entry, etc.) for the particular flow/pressure altering device, to store a predetermined water usage signature corresponding to the flow/pressure altering device and associate the assigned water fixture name with the flow/pressure altering device water usage signature. This process may be repeated for each water fixture in the system. After initialization, the monitoring system may use the assigned water fixture names in a notification to the user of detection of water usage signatures corresponding to the named water fixtures.

Many different types of flow/pressure altering devices may be used. As one example, a pressure compensating aerator ("PCA") 1215 may be provided or installed with at least one of the water fixtures 1210 and configured to produce substantially constant flow across a range of system pressures (e.g., 40-80 psi). As one example, a conventional PCA includes a fluid coupling fitted with an o-ring that deforms with increasing fluid pressures to increasingly partially block flow passages in the coupling, such that a substantially constant flow rate (e.g. a predetermined flow value between about 1 gpm and about 4 gpm, for example, about 1.5 gpm) is maintained across a range of fluid pressures. The control logic of the monitoring system may be configured to store and associate flow data or a water usage signature corresponding to the selected PCA 1215 with the water fixture 1210 with which the selected PCA is assembled, such that the monitoring system may identify use of this water fixture based on detection of the corresponding water usage signature.

In one such arrangement, the water usage monitoring and control system may be configured to control operation of the valve to perform a "sweep" across a range of pressure values, using pressure differential and valve position flow coefficient (or alternatively, a separate flow meter) to determine flow rate across the range of plumbing system values (e.g., as shown in FIGS. 6 and 7). By comparing this pressure vs. flow rate curve to stored pressure vs. flow rate signatures for the water fixtures in the plumbing system, water use can be identified and attributed to the corresponding water fixture. To distinguish multiple water fixtures from each other, different flow/pressure altering devices may be used with each water fixture, producing pressure vs. flow rate curves having different slopes and/or amplitudes. Where the measured pressure vs. flow rate curve is distinct from the stored signatures, the monitoring system may be configured to identify the corresponding water usage as a potential leak, or as water usage from a fixture that has not been identified (e.g., for generating and assigning a new signature for storage in the control module). The user may be prompted by the system (e.g., by an SMS text prompt or an audible/visible alert at the valve, the control module, or a smartphone or other remote device) to investigate the source of this unidentifiable water usage. In some systems, in response to detection of an unidentified low water usage event (consistent with a leak or improper shutoff) immediately subsequent to detection of identified use of a particular water fixture (e.g., due to identification of a flow rate corresponding to a fixture-specific PCA, or some other water signature), the system may provide an alert that the detected leak or improper shutoff is likely associated with that particular water fixture.

Figure 12B:
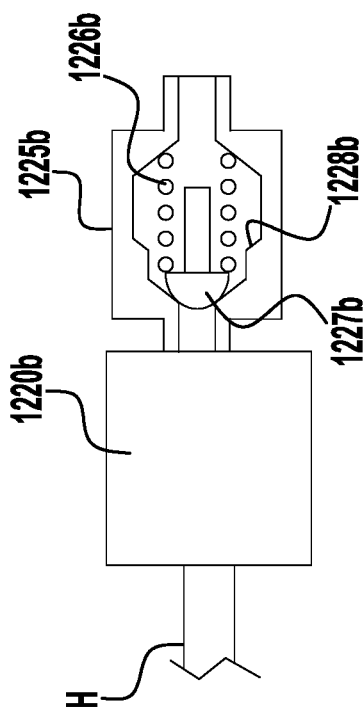
FIG. 12B is a schematic illustration of another water fixture with a pressure and time dependent flow regulator, according to an exemplary embodiment of the present disclosure.
Figure 12A:
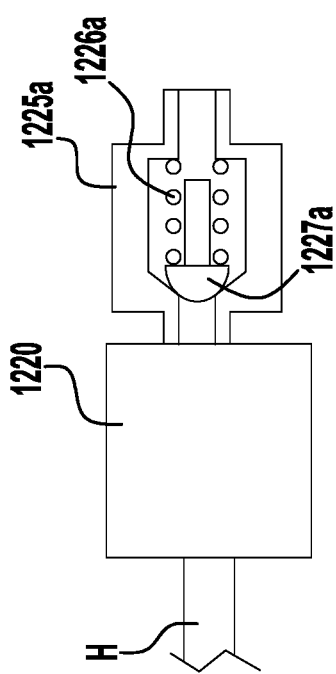
FIG. 12A is a schematic illustration of a water fixture with a pressure and time dependent flow regulator, according to an exemplary embodiment of the present disclosure.

As another example, a water fixture 1220 may be provided with a pressure and time dependent flow regulator (e.g., check valve) 1225 configured to produce distinct flow curves over time, for example, due to variations in the internal flow path. For example, as shown in FIG. 12A, a flow regulator check valve 1225*a* may be provided with a spring 1226*a* having a selected strength/stiffness to provide a selected delay in the pressurized movement of the check valve poppet 1227*a*, and a corresponding delay in the flow increase through the water fixture 1220*a*. As another example, as shown in FIG. 12B, a flow regulator check valve 1225*b* may additionally or alternatively be provided with an internal flow path contour 1228*b* (e.g., tapered, stepped, or sinusoidal surface) configured to affect the time dependent flow curve when the associated water fixture is used, by providing a varying gap between the flow path and the valve poppet 1227*b*. By measuring flow rate (e.g., using pressure differential and valve position flow coefficient or alternatively, a separate flow meter) over time, from the instant water usage is detected, and comparing the flow rate vs. time curve to stored flow rate vs. time signatures for the water fixtures in the plumbing system, water use can be identified and attributed to the corresponding water fixture. To distinguish multiple water fixtures from each other, difference flow regulators may be used with each water fixture, producing flow rate vs. time curves having different slopes and/or amplitudes. Where the measured flow rate vs. time curve is distinct from the stored signatures, the monitoring system may be configured to identify the corresponding water usage as a potential leak, or as water usage from a fixture that has not been identified (e.g., for generating and assigning a new signature for storage in the control module).

Additionally or alternatively, one or more water fixtures 1230 may be provided with an active marker 1235 configured to generate a signal transmitted to the control module 1060 to identify detected water usage as corresponding to the signaling fixture 1230. Examples may include one or more sensors (e.g., flow sensor, moisture sensor, vibration sensor) located at the water fixture 1230 and configured to transmit a signal (e.g., wired or wireless transmission, direct or indirect transmission) to the control module. In some embodiments, some water fixtures in a plumbing system may utilize active markers, while other water fixtures in the plumbing system are identified using passive markers.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method of identifying usage of a water fixture in a plumbing system including at least first and second water fixtures operable to supply water from a water source, the method comprising:
   providing a first flow modulating device with the first water fixture, wherein the first flow modulating device provides a first identifiable flow characteristic corresponding to use of the first water fixture;
   measuring a flow rate from the water source to the plumbing system; and
   comparing the measured flow rate with the first identifiable flow characteristic to identify use of the first water fixture.

2. The method of claim 1, wherein measuring the flow rate from the water source to the plumbing system comprises:
   providing a proportional control valve including a valve element operable to control fluid flow from the water source to the plumbing system;
   measuring a first pressure upstream of the valve element and a second pressure downstream of the valve element to identify a pressure differential across the valve element; and
   in response to the identified pressure differential, adjusting the proportional control valve to one of a plurality of flow positions to adjust the pressure differential across the valve element to substantially match a predetermined pressure differential; and
   determining a flow rate through the proportional control valve based on the first pressure, the second pressure, and the adjusted flow position of the valve element.

3. The method of claim 2, wherein measuring the first and second pressures comprises transmitting upstream and downstream pressure signals to a control module from upstream and downstream pressure sensors in fluid communication with inlet and outlet ports of the proportional control valve.

4. The method of claim 3, wherein the proportional control valve includes an electronically operated actuator operable to adjust the valve element, wherein adjusting the proportional control valve comprises transmitting a control signal from the control module to the electronically operated actuator.

5. The method of claim 2, wherein the predetermined pressure differential is less than about 10 psi.

6. The method of claim 2, wherein the plurality of flow positions includes a minimum flow position providing a flow rate of less than 0.05 gpm at a pressure differential of 5 psi.

7. The method of claim 2, wherein the open position provides a flow rate of at least 10 gpm at a pressure differential of 5 psi.

8. The method of claim 2, wherein the valve element comprises a stem with a tapered flow regulating stem tip engageable with an annular valve seat in the valve body when the valve element is in the closed position.

9. The method of claim 2, wherein the valve element comprises a threaded stem and the electronically operated actuator comprises a motorized rotary actuator.

10. The method of claim 1, further comprising varying a supply of water from the water source to the plumbing system to apply water pressure to the plumbing system across a predetermined range of pressure values, wherein the first flow modulating device is configured to provide the first identifiable flow characteristic across the predetermined range of pressure values.

11. The method of claim 1, wherein the first flow modulating device comprises a pressure compensating aerator.

12. The method of claim 1, further comprising storing water usage signature data corresponding to the first identifiable flow characteristic, wherein comparing the measured flow rate with the first identifiable flow characteristic comprises comparing the measured flow rate with the stored water usage signature data.

13. The method of claim 1, wherein the first flow modulating device comprises a portion of the water fixture that inherently produces a distinct water usage signature.

14. The method of claim 1, wherein the first flow modulating device comprises a flow altering device installed with the water fixture.

15. The method of claim 1, wherein the water fixture is a first water fixture, and the plumbing system includes at least a second water fixture provided with a second flow modulating device configured to provide a second identifiable flow characteristic corresponding to use of the second water fixture.

16. The method of claim 15, further comprising storing water usage signature data corresponding to the first and second identifiable flow characteristics.

17. The method of claim 16 wherein storing water usage signature data corresponding to the first and second identifiable flow characteristics comprises prompting a user to turn on each of the first and second water fixtures, prompting the user to input names for each of the first and second water fixture, and measuring and recording flow-related data corresponding to use of each of the first and second water fixtures.

18. The method of claim 1, further comprising generating a user communication indicating a likely leak at the water fixture when fluid usage consistent with leakage is measured after identified usage of the water fixture.

19. The method of claim 1, wherein the measured flow rate comprises a measured flow rate over time, the method further comprising comparing the measured flow rate over time to one or more thresholds corresponding to improper fluid usage, and in response to the measured flow rate over time exceeding one of the one or more thresholds, generating a user communication indicating likely improper fluid usage.

20. The method of claim 1, wherein the measured flow rate comprises a measured flow rate over time, the method further comprising comparing the measured flow rate over time to one or more thresholds corresponding to improper fluid usage, and in response to the measured flow rate over time exceeding one of the one or more thresholds, automatically moving the proportional control valve to a closed position.

21. The method of claim 1, wherein the flow modulating device comprises a flow regulator.

22. The method of claim 21, wherein the flow regulator comprises a flow regulating valve.

23. The method of claim 22, wherein the flow regulating valve comprises a check valve.

\* \* \* \* \*